US010717334B2

(12) United States Patent
Wolf-Monheim

(10) Patent No.: US 10,717,334 B2
(45) Date of Patent: Jul. 21, 2020

(54) WHEEL CARRIER FOR A VEHICLE SUSPENSION

(71) Applicant: FORD GLOBAL TECHNOLOGIES, LLC, Dearborn, MI (US)

(72) Inventor: Friedrich Wolf-Monheim, Aachen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 15/993,066

(22) Filed: May 30, 2018

(65) Prior Publication Data

US 2018/0361810 A1 Dec. 20, 2018

(30) Foreign Application Priority Data

Jun. 14, 2017 (DE) ........................ 10 2017 210 033

(51) Int. Cl.

*B60G 7/00* (2006.01)
*B60G 3/20* (2006.01)
*B60G 7/02* (2006.01)

(52) U.S. Cl.

CPC ............... *B60G 7/008* (2013.01); *B60G 3/20* (2013.01); *B60G 7/02* (2013.01); *B60G 2200/144* (2013.01); *B60G 2204/143* (2013.01); *B60G 2204/1484* (2013.01); *B60G 2204/422* (2013.01); *B60G 2206/50* (2013.01); *B60G 2206/7101* (2013.01); *B60G 2206/72* (2013.01)

(58) Field of Classification Search

CPC . B60G 7/008; B60G 7/02; B60G 3/20; B60G 2204/143; B60G 2206/72; B60G 2206/50; B60G 2204/1484; B60G 2200/144; B60G 2204/422; B60G 2206/7101; B60G 2200/14; B60G 2206/10; B60G 2206/15; B60G 7/001; B60G 3/28; B60G 3/18

See application file for complete search history.

(56) References Cited

U.S. PATENT DOCUMENTS

| | | | | |
|---|---|---|---|---|
| 4,650,620 | A * | 3/1987 | Owen | B29C 44/12 264/137 |
| 4,772,044 | A * | 9/1988 | Booher | B29C 70/52 267/149 |
| 6,811,169 | B2 * | 11/2004 | Schroeder | B60G 3/28 267/149 |
| 2017/0210418 | A1 * | 7/2017 | Sakuma | B62D 7/18 |

FOREIGN PATENT DOCUMENTS

| | | | | |
|---|---|---|---|---|
| DE | 102009002939 | A1 | 11/2010 | |
| EP | 1070604 | A1 * | 1/2001 | B60B 27/02 |
| EP | 3524449 | A1 * | 8/2019 | B60G 7/00 |

* cited by examiner

*Primary Examiner* — Darlene P Condra

(74) *Attorney, Agent, or Firm* — Raymond L. Coppiellie; Brooks Kushman PC

(57) ABSTRACT

A wheel carrier for a vehicle suspension, intended for the rotatable mounting of a wheel, having a wheel carrier body made of metal is adapted to provide a stable, weight-optimized wheel suspension. The wheel carrier includes a wheel-attachment section and an extension projecting upwardly therefrom with means at its upper end for attaching an inboard-projecting control arm. A portion of the extension is offset inboard relative to the upper end and includes a hybrid section in which the wheel carrier body is reinforced in sections by a reinforcing element made of a fiber composite material.

9 Claims, 2 Drawing Sheets

30
1.5
12
14
8
5
10
3
1.4
1.6
1.7
7
4
2.1
20
1.1
II
II
2
1
6
11
1.2
13
1.3
7
9
Z
Y

WHEEL CARRIER FOR A VEHICLE SUSPENSION

CROSS-REFERENCE TO RELATED APPLICATIONS

This application claims foreign priority benefits under 35 U.S.C. § 119(a)-(d) to DE Application 10 2017 210 033.8 filed Jun. 14, 2017, which is hereby incorporated by reference in its entirety.

TECHNICAL FIELD

The invention relates to a wheel carrier for a vehicle suspension, and to a wheel carrier constructed to permit a wheel/tire mounted thereto to be positioned more inboard that would otherwise be the case.

BACKGROUND

In motor vehicles, the wheels are normally rotatably mounted on wheel carriers, which are themselves connected to the vehicle structure. The wheel carrier thus essentially forms a stable receiver for the axle of the respective wheel. The connection between the wheel carrier and the vehicle structure can be affected via various control arms (also commonly referred to in the pertinent art as links), which are movably connected between the wheel carrier and the chassis or a subframe, for example. The nature and the number of the control arms per wheel carrier can be different, or, for example, one or more transverse arms and longitudinal arms and/or semi-trailing arms can be provided. The function of the control arms involves guiding the wheel carrier, and thus the wheel, as well as a movable connection with the vehicle structure. The wheel carrier is normally part of the unsprung mass, whereas the vehicle structure is part of the sprung mass. Spring elements and dampers can be attached between the vehicle structure and either the wheel carrier itself or one of the arms.

In many cases, both the arms and the wheel carrier consist of metal, for example steel, grey cast iron or aluminum. In addition, composite materials such as fiber-reinforced plastic are also used to some extent. The choice of material is generally arrived at in such a way that the stability required for safety and travelling comfort is assured. On the other hand, there has been an increased requirement, in particular in more recent times, for a reduction in the weight of all vehicle components in order to save fuel and to reduce $CO_2$ emissions.

DE 10 2009 002 939 A1 discloses a suspension having components which are fabricated to include fiber composite material.

In the light of the outlined prior art, the provision of a wheel suspension, which is optimized in respect of its weight and as such possesses adequate stability, still leaves room for improvement.

SUMMARY

The invention has as its object to make available a stable, weight-optimized wheel suspension.

It should be noted at this point that the characterizing features and measures that are presented individually in the following description can be combined with one another in an arbitrary, technically expedient manner and propose further embodiments of the invention. The description characterizes and specifies the invention additionally, in particular in conjunction with the Figures.

The wheel carrier disclosed herein is intended in particular for motor vehicles such as goods vehicles or passenger vehicles. However, an application for trailers, for example, is also possible. The wheel carrier is used for the rotatable mounting of a wheel and has a wheel carrier body made of metal. The wheel carrier can be envisaged for this purpose so as to be movably connected to a vehicle structure, for example a chassis or a subframe, via one or multiple arms/links. The wheel carrier body is made of metal, for example steel, grey cast iron and/or aluminum. It accounts for the larger part of the wheel carrier in terms of volume. It can be configured in one or multiple parts. In particular, the wheel carrier body can be configured for the rotatable mounting of the wheel.

The disclosed wheel carrier has a hybrid section, in which the wheel carrier body is reinforced in sections by a reinforcing element made of a fiber composite material. The fiber composite material can also be designated as a fiber-reinforced plastic, wherein fibers are embedded in a matrix made of a polymer, for example a synthetic resin. For example, carbon fibers, glass fibers and/or aramid fibers can be considered as fibers. As is previously known, practically any desired forms can be executed with suchlike fiber composite materials, so that practically no restrictions also apply in respect of the form of the reinforcing element and thus also of the hybrid section.

The reinforcing element can form a composite together with the metallic wheel carrier body inside the hybrid section, wherein it is capable of being connected to the wheel carrier body in particular with a substance-to-substance bond or, where necessary, also with a force fit and/or a form fit. In the context of the manufacturing process, the reinforcing element can be formed directly on the wheel carrier body, wherein the curing of the polymer in the matrix takes place directly on the wheel carrier body. The form necessary for a form fit is produced in this way, and a substance-to-substance bond is ideally produced at the same time. The reinforcement in this case is in sections, i.e. the hybrid section, in which the reinforcing element is disposed, forms only a section of the wheel carrier body.

As a result of the inventive reinforcement of the wheel carrier body in sections, said body possesses a particular strength inside the hybrid section, wherein a significant saving in weight can be achieved because of the use of the fiber composite material, which is substantially lighter than the metal of the wheel carrier body. At the same time, the mechanical properties of the hybrid section are generally also superior to those of a fiber composite material made completely from a manufactured component.

Basically, different possibilities for attachment to a vehicle structure are conceivable in the case of the inventive wheel carrier. According to a preferred embodiment, the wheel carrier has an upper arm attachment section for an upper transverse arm as well as a lower arm attachment section for a lower transverse arm. I.e. the wheel carrier is designed for a suspension with double transverse arms. Provision can be made in this case, for example, for the upper transverse arm to be shorter than the lower transverse arm, which is also designated as an SLA ("short and long arm") suspension. The respective arm attachment section in this case is the region that is provided and configured for the attachment of the respective transverse arm. It typically has a recess or receiver in this case, in which, for example, a bearing sleeve or an axle pin can be disposed, via which the respective transverse arm is mounted movably with respect to the wheel carrier. The two arm attachment sections are preferably executed on the wheel carrier body. Likewise, both arm attachment sections are preferably executed outside the hybrid section.

At least for the most part, the reinforcing element is preferably surrounded by the wheel carrier body. In other words, the wheel carrier body has a cavity, in which, at least for the most part, the reinforcing element is contained. In this case, the wheel carrier body can have a U-shaped profile in the hybrid section, in which the reinforcing element is disposed and is thus surrounded on three sides. Advantageously, the wheel carrier body can surround the reinforcing element almost completely, wherein a cavity, in which the reinforcing element is disposed, can be configured inside the wheel carrier body. In particular, the reinforcing element can fill the cavity completely.

According to one embodiment, the wheel carrier has a wheel-attachment section for the wheel as well as, projecting therefrom upwards to the upper arm attachment, an arm section, in which the reinforcing element is at least partially disposed. The wheel-attachment section is intended for the attachment or rotatable mounting of the wheel. For example, a receiver for the rotary axle of the wheel can be disposed there. The wheel-attachment section can be formed in particular by the wheel carrier body. The upper arm attachment section in this case, depending on its embodiment, can also be regarded as part of the extension. The extension projects upwards and along the Z-axis, although in general it runs not parallel or not completely parallel thereto. If the extension does not run parallel to the Z-axis, it can be inclined, for example, in the direction of the X-axis and/or the Y-axis. Where reference is made here and below to the X-, Y- and Z-axis, this relates to the intended installed condition of the wheel carrier. Although the expression “extension” must not be interpreted in a restrictive way in this context, the extension can preferably be of elongated configuration, i.e. its dimension in the direction of orientation from the wheel-attachment section to the upper arm attachment section can be several times larger than its dimension transversely thereto. The reinforcing element is disposed at least partially, preferably for the most part, and more preferably completely, inside the extension. I.e. the extension is selectively reinforced, so that in the case of a low weight, for example in the case of a slim design, it also transmits the forces reliably between the upper transverse arm and the vehicle wheel. In this case, the direction of orientation of the fibers inside the reinforcing elements can correspond at least partially to the direction of orientation of the extension.

In particular the extension, at least in some areas, may comprise a sheath formed by the wheel carrier body, inside which sheath the reinforcing element is disposed. In this case the wheel carrier body in the region of the extension surrounds the reinforcing element. The sheath, which could also be described as a wall, surrounds the reinforcing element at least for the most part. The sheath in this case can have a constant or even variable wall thickness. Configured inside the sheath is a cavity, in which the reinforcing element is disposed to a certain extent as a core. It can fill the cavity completely or partly.

The extension further has a portion that is set back inboard (parallel with the Y-axis, toward the longitudinal centerline of the vehicle) with respect to the upper arm attachment section. The set-back section, to be precise its outer contour, is thus displaced with respect to the upper arm attachment section in the direction of the central axis of the vehicle. In other words, the upper arm attachment section projects outboard (in a direction having a component along the Y-axis) with respect to the set-back section. In this case, at least a part of the extension (viewed from the direction of the upper arm attachment section) projects inboard, that is to say towards the longitudinal centerline of the vehicle. A space, which can be used constructively, as explained below, is provided outboard of the set-back section.

A tire of the wheel can thus be capable of being disposed externally in relation to the set-back section in the direction of the Y-axis. A wheel carrier is normally proposed for a particular wheel size, so that the position of the tire of the wheel is pre-determined. This, of course, forms the radially outermost part of the wheel (farthest from the rotary axle of the wheel). This usually also corresponds to the broadest part of the wheel in the direction of the rotary axle. The fact that the tire (normally an upper section of same) is disposed outboard of the set-back section in the direction of the Y-axis, means that it is situated in or adjacent to the above-mentioned space, for which reason the vehicle wheel can be displaced further towards the inside for the same length of the upper transverse arm, or the upper transverse arm can be of longer configuration for the same position of the wheel.

As previously mentioned, the reinforcing element is preferably disposed at least partially in the extension, in order for it to be reinforced selectively. In this case, the reinforcing element can be disposed, at least for the most part, in particular in the set-back section.

In order to produce the desired stiffness or elasticity, the extension can have an appropriate cross section within the X-Y-plane in the region of the hybrid section. For example, the aforementioned cross section can be of circular, elliptical or rectangular configuration. In the case of an elliptical cross section, the main axes of the ellipse can be aligned in the direction of the X-axis and the Y-axis, although an alignment at an angle to said axes would also be conceivable. In the case of a rectangular cross section, the sides of the rectangle can also be aligned along the X-axis and the Y-axis or at an angle thereto. The respective cross section in this case can correspond to a cross section of the above-mentioned sheath, wherein the reinforcing element disposed inside the sheath can also have a corresponding cross section. A reinforcing element with a rectangular cross section can thus be disposed, for example, inside a sheath with a rectangular cross section.

The expression circular cross section is understood to denote that the dimensions of the extension in the direction of the X-axis and in the direction of the Y-axis are the same. In general terms, however, these dimensions may, on the other hand, be selected with different values, for example in order to set a desired direction-dependent stiffness or elasticity. In general terms, a dimension of the extension in the region of the hybrid section in the direction of the X-axis can be smaller than, larger than or the same as a dimension in the direction of the Y-axis. I.e. in the case of a rectangular cross section this can be of square configuration, for example, or can even be extended in the direction of the X-axis or in the direction of the Y-axis. In the case of an elliptical cross section, for example, the large semimajor axis of the ellipse can extend in the direction of the X-axis or in the direction of the Y-axis.

Further advantageous details and effects of the invention are explained below in more detail on the basis of illustrative embodiments represented in the Figures. In the drawing:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Identical parts are always provided with the same reference designations in the different Figures, for which reason said parts are also described only once as a rule.

Figure 1:
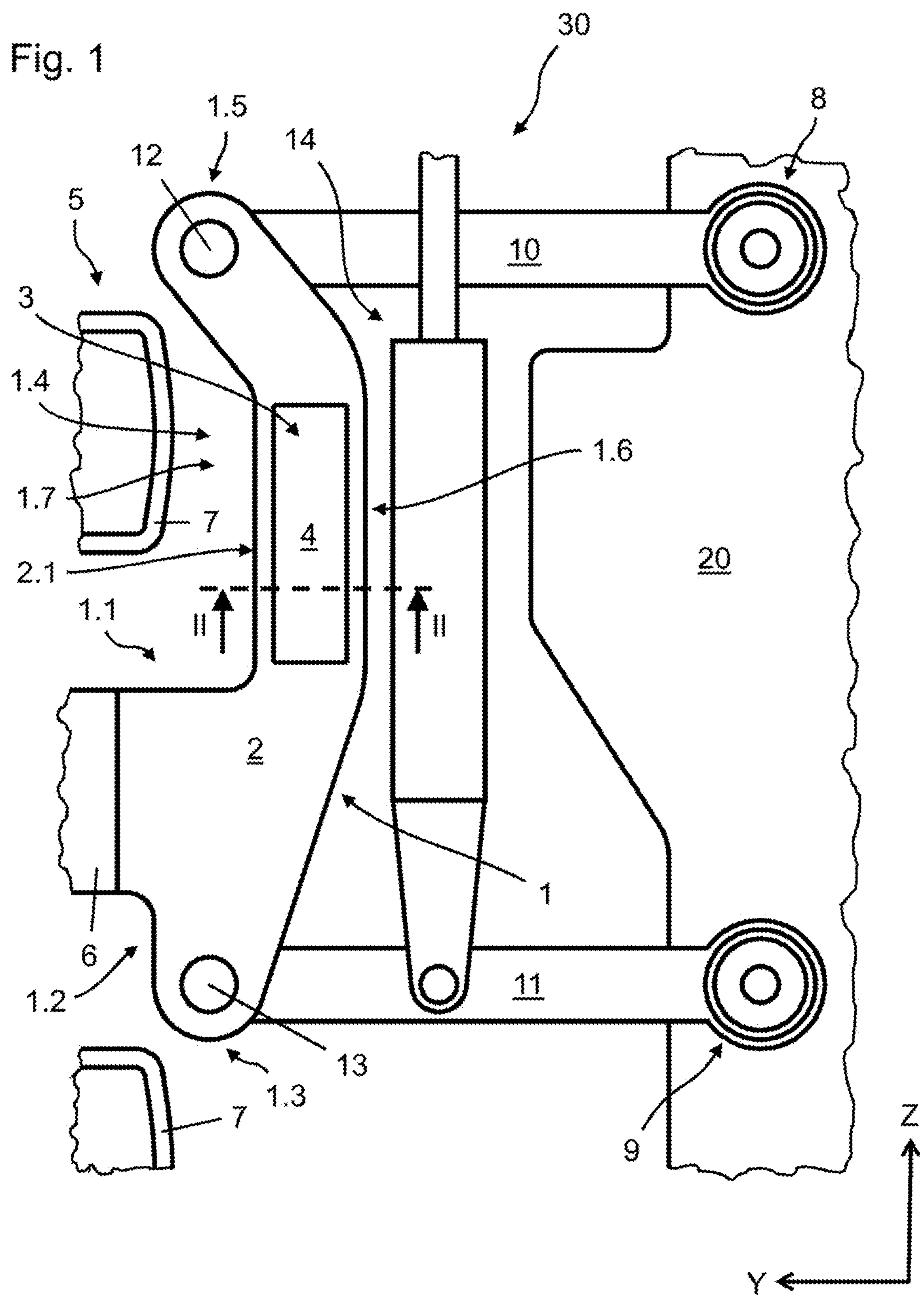
FIG. 1 depicts a front view of a wheel suspension with an inventive wheel carrier.

FIG. 1 depicts a front view of a wheel suspension 30 of a vehicle, for example a passenger vehicle. For easier orientation, the X-, Y- and Z-axes of the vehicle are marked in the Figures. An upper control arm 10 as well as a lower control arm 11 are pivotably mounted on a vehicle structure 20 via conventionally-known bushings 8, 9 allocated to them. Both control arms 10, 11 are represented here with the same length, although as an alternative, however, for example the upper control arm 10 corresponding to an SLA-suspension could also be of shorter configuration than the lower control arm 11. A damper 14 is connected, at its upper end, via a connection to the vehicle structure 20 (at a location not represented here) and, at its lower end, to the lower control arm 11.

A wheel carrier 1 is connected via ball-joints 12, 13 to the upper and lower transverse control arms 10, 11. The wheel carrier 1 has a wheel-attachment section 1.1, and a hub 6 of a wheel 5 is received thereon, in particular on an outboard-most side or face thereof. Beneath (lower in the direction of the Z-axis) the wheel-attachment section 1.1, a lower arm attachment section 1.3, which receives the lower ball-joint 13, is configured on a lower extension 1.2. An upper extension 1.4 projects upwards, starting from the wheel-attachment section 1.1, configured at the upper end of which is an upper arm attachment section 1.5, which receives the upper ball-joint 12.

The wheel carrier 1 is for the most part formed by a wheel carrier body 2, which consists of metal, for example steel, grey cast iron or aluminum. In a hybrid section 1.6 configured inside the extension 1.4, however, the wheel carrier body 2 comprises a sheath 2.1 around a cavity 3, in which a reinforcing element 4 made of fiber-reinforced plastic is disposed. The reinforcing element 4 is connected to the wheel carrier body 2 with a form fit and a substance-to-substance bond. It forms a selective structural reinforcement inside the extension 1.4, wherein the connection made of fiber-reinforced plastic and metal permits excellent strength combined with low weight. In addition, because of the strength that is achieved in this way, the comparatively elongated extension 1.4 can be of relatively thin configuration, which helps to make sufficient room available for the vehicle wheel, without the entire wheel suspension becoming too wide. This is further facilitated by the fact that the wheel carrier 1 has a section 1.7 that is set back with respect to the upper arm attachment section 1.5 in the direction of the Y-axis towards the center of the vehicle (to the right, therefore, in FIG. 1), in which the hybrid section 1.6 is disposed. As a result, a tire 7 of the wheel, which is disposed in the direction of the Y-axis outside the set-back section 1.7, can be disposed further inwards in relation to the upper arm attachment section 1.5, without the risk of the tire 7 coming into contact with the wheel carrier 1. The necessary space that is required collectively for the wheel 5, the wheel carrier 1 and the damper unit 14 is thus kept small in the direction of the Y-axis.

Figure 2A:
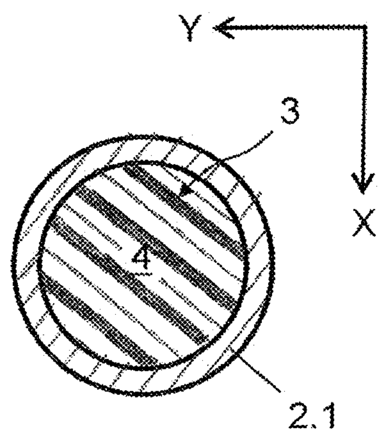
FIGS. 2A-2F depict alternative cross-sectioned views along the line II-II in FIG. 1.
Figure 2B:
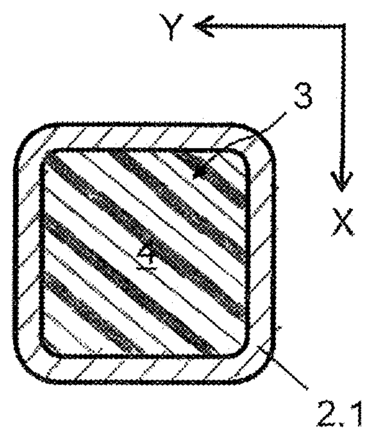
Figure 2C:
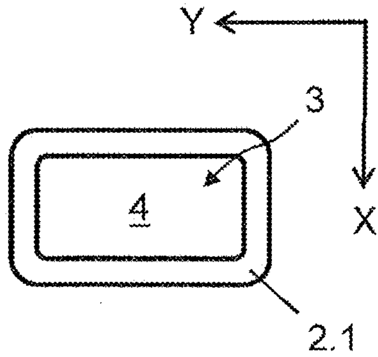
Figure 2D:
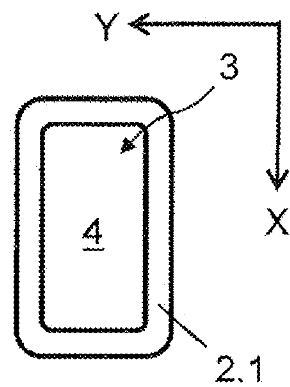
Figure 2E:
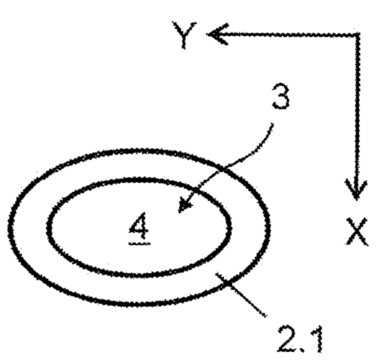
Figure 2F:
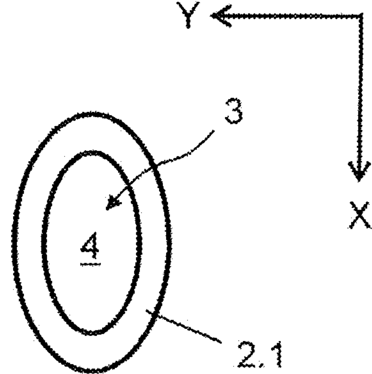

FIGS. 2A-2F are sectioned views along the line II-II in FIG. 1, that is to say in the X-Y-plane, each view showing an alternative configuration of the extension 1.4. FIG. 2A depicts a first embodiment, in which the sheath 2.1 has a circular cross section, having a likewise circular cavity 3, in which the reinforcing element 4 is disposed. FIG. 2B depicts an alternative embodiment, in which the sheath 2.1 has a rectangular, approximately square cross section, wherein a dimension in the direction of the X-axis and a dimension in the direction of the Y-axis are equal in size. For example, the flexural strength of the extension 1.4 in the direction of the X-axis and in the direction of the Y-axis is accordingly also approximately equal in value. This can also be changed, however, if necessary, as depicted in the illustrative embodiments according to FIG. 2C and FIG. 2D, in which the dimension in the direction of the X-axis is smaller or larger than in the direction of the Y-axis. The same is true of the illustrative embodiments according to FIGS. 2E and 2F, wherein the sheath 2.1 has an elliptical cross section and has the semimajor axis of the corresponding ellipse in the direction of the Y-axis or in the direction of the X-axis. It will be appreciated that the flexural strength in the direction of the axis, in which the larger expansion is present, is increased in each case.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheel carrier for a vehicle comprising:

a wheel-attachment section manufactured from metal and adapted to receive a vehicle wheel secured to an outboard side thereof;

an extension projecting upwardly from the wheel-attachment section and having an upper end comprising an arm attachment section adapted for rotatable attachment to an outboard end of an inboard-projecting suspension control arm, a portion of the extension between the wheel-attachment section and the upper end having an outboard surface offset inboard relative to the upper end, the portion comprising metal at least partially surrounding a fiber composite reinforcement; and a lower arm attachment section below the wheel-attachment section adapted for rotatable attachment to an outboard end of an inboard-projecting lower suspension control arm, wherein the outboard surface is offset inboard from the upper end and from an outboard side of the wheel-attachment section to create a space therebetween into which an inboard side of a tire mounted to the heel may project.

2. The wheel carrier of claim 1, wherein the portion comprises metal enclosing the fiber composite reinforcement.

3. The wheel carrier of claim 2, wherein the fiber composite reinforcement has a circular, an elliptical, or a rectangular cross section.

4. A wheel carrier for a vehicle suspension comprising:

a metal outboard-facing wheel-attachment section;

an extension projecting upwardly from the wheel-attachment section, the extension having an upper end rotatably attachable to an inboard-projecting control arm and a set-back portion having an outboard surface offset inboard relative to the upper end, the set-back portion reinforced by fiber composite material; and a lower arm attachment section below the wheel-attachment section adapted for rotatable attachment to an outboard end of an inboard-projecting lower control arm, wherein the outboard surface is offset inboard from the upper end by a distance permitting, an inboard side of a tire mounted to the wheel to be disposed inboard of at east a portion of the upper end.

5. The wheel carrier of claim 4, wherein the set-back portion comprises metal enclosing the fiber composite material.

6. The wheel carrier of claim 5, wherein the fiber composite material has a circular, an elliptical, or a rectangular cross section.

7. A wheel carrier comprising:

a wheel-attachment section for mounting a wheel to an outboard side thereof;

an extension projecting upwardly from the wheel-attachment section, and having an upper end comprising means for rotatably attaching an inboard-projecting suspension control arm and a set-back portion below and offset inboard relative to the upper end, wherein the set-back portion is metal reinforced by fiber composite material; and a lower arm attachment section below the wheel-attachment section adapted for rotatable attachment to an outboard end of an inboard-projecting lower control arm, wherein an outboard surface of the set-back portion is offset inboard from the upper end by a distance permitting an inboard side of a tire mounted to the wheel to be disposed inboard of at least a portion of the upper end.

8. The wheel carrier of claim 7, wherein the set-back portion comprises metal enclosing the fiber composite material.

9. The wheel carrier of claim 8, wherein the fiber composite material has a circular, an elliptical, or a rectangular cross section.

* * * * *